(12) United States Patent
Schmeiser (10) Patent No.: US 11,383,935 B2
(45) Date of Patent: Jul. 12, 2022

(54) APPARATUS FOR THE PROCESSING OF FOOD PRODUCTS

(71) Applicant: Textor Maschinenbau GmbH, Wolfertschwenden (DE)

(72) Inventor: Jorg Schmeiser, Wiggensbach (DE)

(73) Assignee: Textor Maschinenbau GmbH

( * ) Notice: Subject to any disclaimer, the term of this patent is extended or adjusted under 35 U.S.C. 154(b) by 206 days.

(21) Appl. No.: 14/669,548

(22) Filed: Mar. 26, 2015

(65) Prior Publication Data
US 2015/0274431 A1    Oct. 1, 2015

(30) Foreign Application Priority Data

Mar. 28, 2014 (DE) .......................... 102014104387.1

(51) Int. Cl.
*B65G 35/00* (2006.01)
*B29C 51/26* (2006.01)
(Continued)

(52) U.S. Cl.
CPC ............ *B65G 35/00* (2013.01); *B29C 51/261* (2013.01); *B65B 9/04* (2013.01); *B65B 9/10* (2013.01); *B65B 35/24* (2013.01); *B65B 35/30* (2013.01); *B65B 47/04* (2013.01); *B65B 59/00* (2013.01); *B65G 47/26* (2013.01)

(58) Field of Classification Search
CPC ....... B29C 51/261; B65B 47/04; B65B 59/00; B65B 9/04; B65B 9/10; B65B 35/24; B65B 35/30; B65G 47/26
USPC .................. 53/300–302, 282, 276, 562, 393; 425/403.1
See application file for complete search history.

(56) References Cited

U.S. PATENT DOCUMENTS 3,561,512 A * 2/1971 Farmer .................... A23N 4/20
  99/484
4,034,536 A   7/1977 Mahaffy et al.
(Continued)

FOREIGN PATENT DOCUMENTS

CH       683176 A5    1/1994
DE      4407639 A1    9/1995
(Continued)

OTHER PUBLICATIONS

GEA ShingleLoader; "Slicing Performance"; GEA Food Solutions; http://www.gea-foodsolutions.com/media/b04.04.05en_042014_b04.04.05_shingleloader_(v2.pdf); 2014, pp. 1-4.
(Continued)

*Primary Examiner* — Andrew M Tecco
*Assistant Examiner* — Nicholas E Igbokwe
(74) *Attorney, Agent, or Firm* — Dickinson Wright PLLC (57) ABSTRACT

An apparatus for processing food products comprises a product conveyor having a frame and a conveyor unit for conveying products along a conveying direction, wherein the conveyor unit is arranged laterally projecting at the frame with respect to the conveying direction and comprises a work unit which is associated with the processing of the conveyed products and which is arranged at least partly beneath the projecting conveyor unit of the product conveyor. Provision is made that the frame of the product conveyor is supported or held at the work unit via a mechanical connection or extends into a free space defined by the work unit.

10 Claims, 10 Drawing Sheets

(51) Int. Cl.
*B65B 35/30* (2006.01)
*B65B 47/04* (2006.01)
*B65B 9/10* (2006.01)
*B65G 47/26* (2006.01)
*B65B 9/04* (2006.01)
*B65B 35/24* (2006.01)
*B65B 59/00* (2006.01)

(56) References Cited

U.S. PATENT DOCUMENTS

| | | | | |
|---|---|---|---|---|
| 4,548,108 A * | 10/1985 | Dennis | ............... | B26D 5/32 83/13 |
| 5,238,632 A * | 8/1993 | Watters | ............... | B29C 51/02 264/151 |
| 5,271,304 A * | 12/1993 | Wygal | ............... | B26D 5/22 83/408 |
| 5,444,750 A * | 8/1995 | Stewart | ............... | G06M 7/06 235/375 |
| 5,457,942 A * | 10/1995 | Mantovani | ............... | B65B 51/10 53/329.2 |
| 5,481,466 A * | 1/1996 | Carey | ............... | A22C 17/0086 700/167 |
| 5,499,719 A * | 3/1996 | Lindee | ............... | B07C 5/36 198/435 |
| 5,720,149 A * | 2/1998 | Stimpfl | ............... | B65B 19/34 53/244 |
| 5,822,956 A * | 10/1998 | Liechti | ............... | B65B 7/164 53/510 |
| 6,585,477 B1 * | 7/2003 | Lawrence | ............... | A21C 9/086 198/597 |
| 2006/0131131 A1 | 6/2006 | Mayer | | |
| 2009/0241469 A1 * | 10/2009 | Moessnang | ............... | B65B 31/024 53/209 |
| 2012/0042612 A1 | 2/2012 | Weber | | |
| 2012/0159900 A1 * | 6/2012 | Grasselli | ............... | B65G 47/90 53/235 |

FOREIGN PATENT DOCUMENTS

| | | | |
|---|---|---|---|
| DE | 29718630 U1 | 12/1997 | |
| DE | 29801161 U1 | 3/1998 | |
| DE | 10143506 A1 | 5/2003 | |
| DE | 10238482 A1 | 12/2003 | |
| DE | 102006006523 A1 | 8/2007 | |
| DE | 102006020368 A1 | 8/2007 | |
| DE | 102010034676 A1 | 2/2012 | |
| DE | 2522474 A1 * | 11/2012 | ........... B26D 7/0625 |
| EP | 1854596 A1 | 11/2007 | |
| EP | 2522474 A1 * | 11/2012 | ........... B26D 7/0625 |
| FR | 2771080 A1 | 5/1999 | |
| FR | 2821833 A1 | 9/2002 | |
| GB | 2241682 A | 9/1991 | |

OTHER PUBLICATIONS

Communication received from the European Patent Office for related Application No. EP15161101.9; dated Jul. 20, 2017; 6 pages.

* cited by examiner

APPARATUS FOR THE PROCESSING OF FOOD PRODUCTS

CROSS-REFERENCES TO RELATED APPLICATIONS

This application claims priority to German patent application no. 102014104387.1, filed on Mar. 28, 2014, which is incorporated herein by reference, in its entirety.

The present invention relates to an apparatus for processing food products comprising:
- a product conveyor having a frame and a conveyor unit for conveying products along a conveying direction, wherein the conveyor unit is arranged at the frame projecting laterally with respect to the conveying direction; and
- a work unit which is associated with the processing of the conveyed products and which is arranged at least partly beneath the projecting conveyor unit of the product conveyor.

In the industrial processing of food products such as meat products, sausage products or cheese products, so-called production lines are frequently used which comprise, in addition to a cutting apparatus such as a high-performance slicer, a plurality of conveying devices arranged in a row next to one another such as portioning conveyors, row-forming conveyors, spreading conveyors, distributor conveyors, buffer conveyors and feed conveyors. A packaging machine is typically located at the end of such a production line and provides an arrangement of packagings from a provided plastic film web by means of a deep-drawing process, with the products being fed into said packaging by means of a feed conveyor, as a rule format set by format set. Such a packaging machine with a deep-drawing unit is also called a "deep-drawing machine" in the technical sector. The feed conveyor is equally frequently abbreviated to a "feeder". To enable a reliable feeding, the feeder has to be positioned above the deep-drawing machine, which is possible without problem with a laterally projecting arrangement of the conveyor unit.

Any desired device which serves for a processing, treatment and/or handling of individual food products or portioned foods products is generally to be understood as an "apparatus for processing food products" in the sense of the invention. It is further understood that an arrangement of a product conveyor having a laterally projecting conveyor unit and a work unit arranged at least partly beneath the conveyor unit can be used in a variety of manners in the environment of food treatment and food processing, that is not only in the form of a combination of feeder and deep-drawing machine. For example, the work unit could also be a further product conveyor.

In most practical cases, the conveyor units of a feeder have to be suitable for a conveying by format set and must therefore have a working width of 40 cm to 80 cm, that is must project laterally in a relatively pronounced manner. The construction must furthermore be sufficiently rigid since vibrations are not acceptable in operation which could impair a proper alignment of the products or of the portions. At the same time, good accessibility of all machine regions for cleaning and maintenance work must be ensured. The relatively large deep-drawing tool in particular has be able to be installed and removed upwardly and to the side. Due to the top-heaviness caused by the construction, the frames also generally have to have a high stability so that they are correspondingly heavy—frequently up to several metric tons (tonnes).

Possibilities are therefore continuously being sought in the technical area to build food processing apparatus in a more compact and lighter manner.

This object is satisfied, on the one hand, by an apparatus having the features of claim 1.

In accordance with the invention, the frame of the product conveyor is supported or held at the work unit via a mechanical connection. The frame is in particular additionally fixed to the work unit. The product conveyor is therefore integrated into the work unit in a mechanical respect. The mass and the stiffness or stability of the work unit can thus be utilized to give the frame of the product conveyor additional stability. As a result, this allows a lighter and more compact construction for the product conveyor. The invention is inter alia based on the recognition that it is not necessary in many use situations of the above-named kind to design the work unit and the product conveyor as separate, stable machines since they are anyway always used together. In contrast, one has previously cleaved to the idea in the technical field of providing completely separate constructions for deep-drawing machines and feeders, for example.

The invention also relates to an apparatus for processing food products comprising:
- a product conveyor having a frame configured as a carrying rack and a conveyor unit for conveying products along a conveying direction, wherein the conveyor unit is arranged at the frame projecting laterally with respect to the conveying direction; and
- a work unit which is associated with the processing of the conveyed products and which is arranged at least partly beneath the projecting conveyor unit of the product conveyor.

Provision is made in accordance with claim 2 that the frame of the product conveyor extends at least partly into a free space defined by the work unit. The frame can thus develop a higher support effect than on a positioning of the product conveyor next to the positioning unit. The frame can in particular utilize the free space of the work unit by a lateral projection of said frame.

It is therefore the general idea underlying the invention overall to utilize a work unit to be arranged beneath a product conveyor having a laterally projecting conveyor unit to build the product conveyor itself in a more compact and lighter manner. In accordance with the two above-named invention aspects, the mass, stiffness or stability and/or the surrounded space of the work unit can be utilized to improve the support of the product conveyor. It is necessary for this purpose already to take account of the work unit to be later arranged beneath the conveyor unit of a product conveyor on the construction of said product conveyor.

The free space is preferably located in the region of a base and/or in a region close to the floor, in particular between two separate feet of the work unit. Work units such as deep-drawing machines are frequently placed on feet between which there is sufficient free space for receiving a support element, for example a horizontally extending support element, of the product conveyor.

The frame of the product conveyor configured as a carrying rack can have a carrier section which is arranged next to the work unit and which is in particular vertical and can have a standing section which extends into the free space and which in particular projects horizontally. The frame could therefore have an L-shaped cross-section, for example. This allows a particularly compact manner of construction, in particular on a dispensing with of a standing section at the side of the carrier section remote from the work unit. On a use of a horizontally extending stand section with a small construction height, a comparatively small free space beneath the work unit can also be utilized.

Depending on requirements, the frame of the product conveyor can be supported at the work unit in a horizontal direction and/or in a vertical direction. A support in a horizontal direction and in a vertical direction allows a particularly high stability of the total apparatus. The frame is in particular supported at the work unit by at least one horizontal frame region and/or by at least one vertical frame region.

A specific embodiment of the invention provides that the product conveyor is completely carried by the work unit. This means a turning away from the customary principle of always designing product conveyors as separate apparatus. Ultimately, in the named configuration, a work unit is therefore provided having an integrated product conveyor, that is, for example, a deep-drawing machine having an integrated feeder.

The frame of the conveyor can be fastened to the work unit at a spacing from a base and/or from the floor—This means that the product conveyor can be supported on the base or at the floor only via the work unit. The dispensing with of separate feet for the product conveyor allows a considerable saving of weight and construction space. In addition, a food processing machine having few feet is particularly cleaning friendly.

Alternatively, the frame of the product conveyor can be supported both at a base and/or at the floor and at the work unit. This allows a particularly stable total construction.

A preferred embodiment of the invention provides that the frame of the product conveyor is alone not sufficient for a stable carrying of the conveyor unit, i.e. that the frame only provides a sufficient stiffness and stability for carrying and operating the conveyor unit together with the work unit. In other words, the product conveyor is only equipped with a light frame to save costs and construction space. The desired stability is only produced by the support at the work unit and by utilizing its mass and stiffness and stability.

A further embodiment of the invention provides that the frame of the product conveyor is fixed to a holding frame, in particular to a side holding frame, of the work unit. The frame of the product conveyor can, for example, be hung or screwed onto a frame of the work unit. Many work units have frame elements which are accessible from the outside, such as section carriers which can be utilized for an attachment of the frame of the product conveyor.

Provision can be made that the conveyor unit of the product conveyor is movable with respect to its frame between a lowered operating position and a raised maintenance position. When the conveyor unit is in the raised maintenance position, an easy and safe access to the work unit located beneath it is ensured, for example for replacing a deep-drawing tool. It is not necessary in this respect to move the product conveyor as a whole to the side or to carry out complex assembly work.

The conveyor unit of the product conveyor can be movable away from the work unit, in particular by pivoting or folding away.

A joint connection can be provided between the conveyor unit of the product conveyor and the frame, the joint connection allowing a pivoting or a folding away of the conveyor unit relative to the frame with a stationary frame, in particular about a pivot axis extending in parallel with the conveying direction.

A further embodiment of the invention provides that a functional unit of the work unit is movable together with the conveyor unit, with the functional unit preferably being fastened to a lower side, in the lower region and/or beneath the conveyor unit. The functional unit can, for example, be a protective cover of the work unit which has to be removed in the servicing case. Since such a protective cover is movable together with the conveyor unit, for example, between an operating position and a maintenance position, the separate removal of the protective cover is dispensed with for a user. In addition, it can hereby additionally be permanently ensured in all operating positions that product residues or cleaning agent droplets do not move downwardly into the region of the work unit. The handling of the apparatus can thus be simplified and its cleanliness further improved.

The functional unit preferably provides an operating function of the work unit in an operating position and simultaneously an operating function of the conveyor unit, The functional unit can, for example, form a protective cover for a deep-drawing machine and simultaneously a collection apparatus for deflecting or collecting particles which fall down from the conveyor unit located above it. In contrast, it is generally necessary with a separate construction of the deep-drawing machine and of the feeder both to provide the deep-drawing machine with a protective cover and to provide the feeder in the region beneath the conveyor unit with a metal collection sheet or the like.

As mentioned, the work unit can comprise a device or parts of a device for an automatic packaging of the conveyed products, for example a so-called deep-drawing machine. The work unit can, however, generally comprise other and/or further devices for treating and processing the conveyed food products. The product conveyor is preferably configured for feeding the conveyed products into respective packaging units provided by the device for automatic packaging. An apparatus of such a design therefore forms a unit of a packaging machine and of a feed conveyor associated therewith. Such units are frequently required in the environment of food processing and only need to be prepared, in accordance with the invention, on site directly at the installation location due to the modular design of the product conveyor, on the one hand, and of the work unit, on the other hand. Alternatively or additionally, the product conveyor can be configured for a grouping of products or of portions comprising a plurality of individual products for forming rows of products or of portions comprising a plurality of individual products and/or for forming format sets of products or of portions comprising a plurality of individual products.

Provision is made in accordance with an embodiment that positioning means are provided by means of which the position of the frame, in particular of horizontal and/or vertical frame regions, can be set relative to the work unit, in particular with a frame supported or held at the work unit and is held in a respective set state, wherein in particular the positioning means are variable in their length fixing a spacing between the frame and the work unit. An adaptation of the product conveyor to the work unit or to the respective given support situation or holding situation can hereby be carried out on site in a very simple manner. For example, elements or parts of the frame, for example, horizontally or vertically extending frame parts of the product conveyor, can be variable in length to adapt the product conveyor to the work unit or to its means for the support, holding or fixing of the product conveyor.

Provision can furthermore be made that the frame engages beneath or engages around the work unit at the bottom side, wherein in particular a horizontally projecting frame region of the frame extends starting from a side of the work unit, beneath and through it to the oppositely disposed side and is fixed to this oppositely disposed side of the work unit. A particularly uniformly distributed force introduction into the frame of the work unit can hereby be realized. In addition, additional feet for the product conveyor can be dispensed with, whereby a good cleaning of the floor or of the base is facilitated.

Further developments of the invention are also set forth in the dependent claims, in the description and in the enclosed drawings.

The invention will be described in the following by way of example with reference to the drawings.

Figure 1:
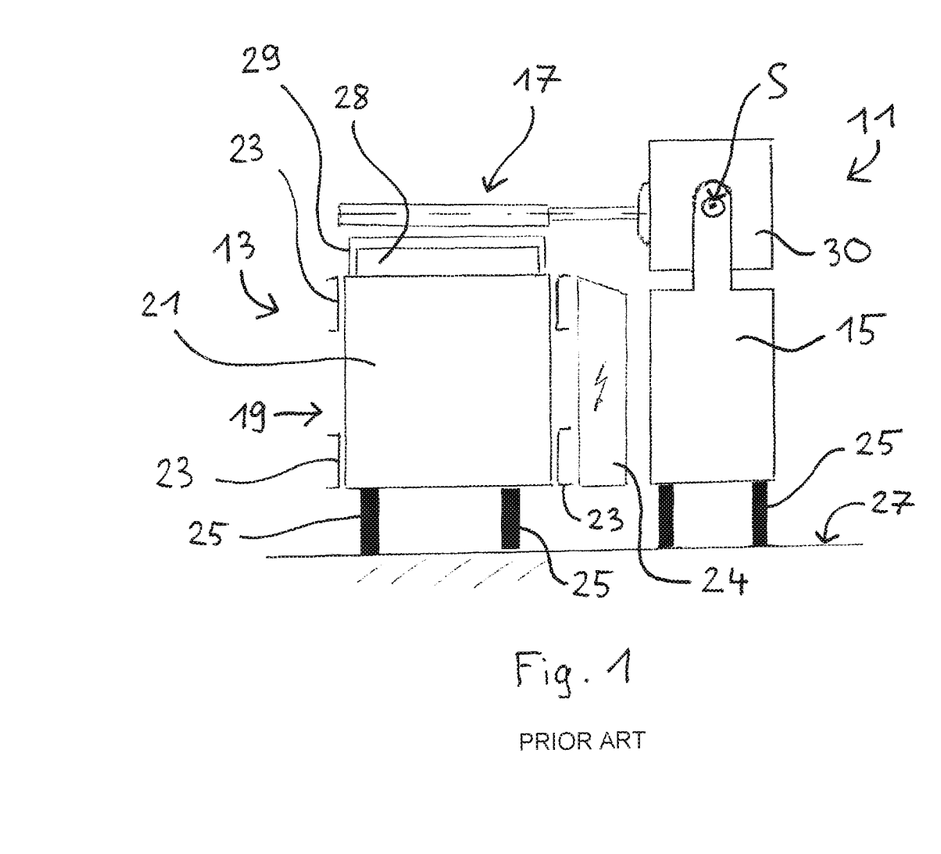
FIG. 1 shows an arrangement designed in accordance with the prior art composed of a product conveyor and of a work unit, wherein a conveyor unit of the product conveyor is located in a lowered operating position.
Figure 2:
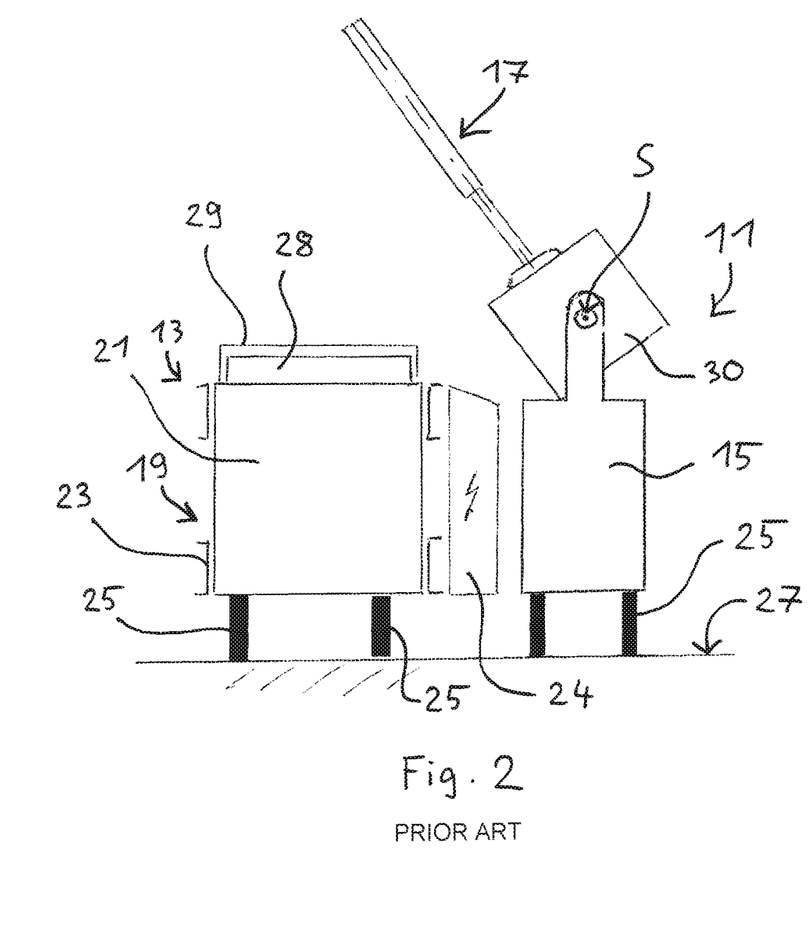
FIG. 2 shows the arrangement in accordance with FIG. 1, wherein the conveyor unit is located in a raised maintenance position.

The apparatus for processing food products shown in FIGS. 1 and 2 and designed in accordance with the prior art comprises a product conveyor 11 and a work unit 13 in the form of an automatic packaging machine. The product conveyor 11 comprises a base rack or a frame 15 and a conveyor unit 17 fixed to the frame 15. The conveyor unit 17 comprises one or more belt or strap conveyors and is, as shown, arranged laterally projecting at the frame 15. The work unit 13 is located beneath the conveyor unit 17 and likewise comprises a base rack or a frame 19 which is here composed of cross members 21 having section-like side carriers 23 attached thereto. A supply and control unit 24 in the form of a switch cabinet is attached to the side of the frame 19 of the work unit 13 at the right in FIG. 1. Both the product conveyor 11 and the work unit 13 are positioned on the floor 27 by means of feet.

The apparatus shown in FIGS. 1 and 2 is integrated into a production line for packaged foods and serves to package product portions sliced by a high-performance slicer, not shown, by format set. The product conveyor 11 is accordingly provided to convey delivered product portions in a conveying direction extending at a right angle to the plane of the drawing and to feed them into an arrangement of packagings provided by the work unit 13. The work unit 13 provides an arrangement of packaging depressions at a transfer section 28 of a provided plastic film web by means of a deep-drawing process. After the feeding of the product portions, the packaging depressions are closed by a likewise provided plastic film web. A protective cover 29 is located above the transfer section 28.

To ensure an easy and safe access to the work unit 13 for conversion work, repair work or servicing work, a housing 30 of the conveyor unit 17 is supported at the frame 15 pivotable about a pivot axis S. It can thus be pivoted, starting from the lowered operating position shown in FIG. 1, into the raised maintenance position shown in FIG. 2.

Figure 3:
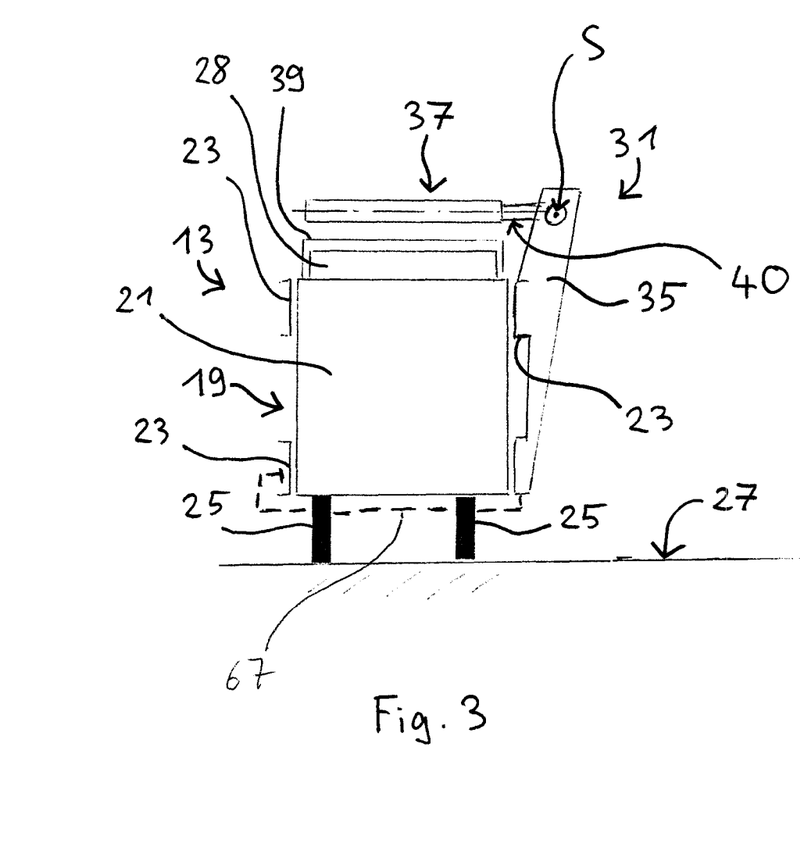
FIG. 3 shows an apparatus for processing food products in accordance with a first embodiment of the invention, wherein a conveyor unit of a product conveyor of the apparatus is located in a lowered operating position.
Figure 4:
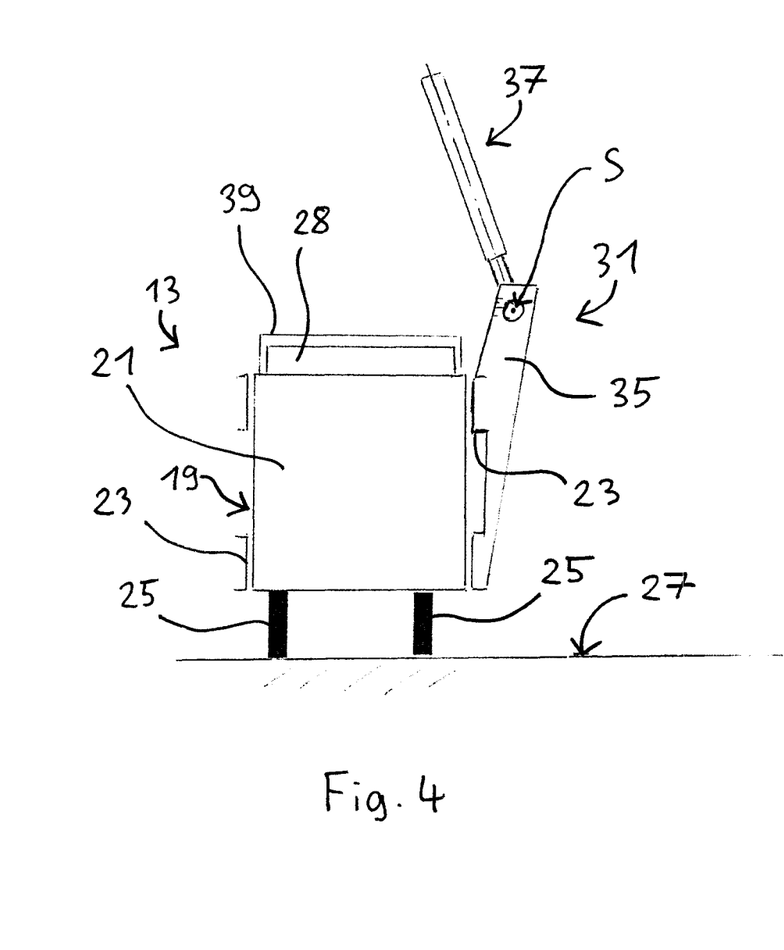
FIG. 4 shows the arrangement in accordance with FIG. 3, wherein the conveyor unit is located in a raised maintenance position.
Figure 5:
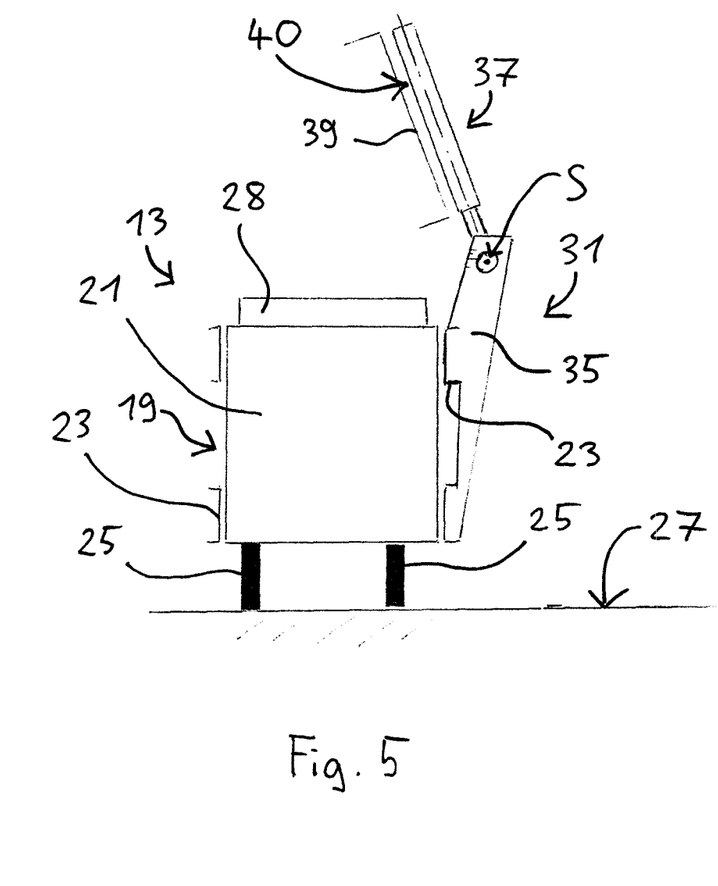
FIG. 5 shows the apparatus in accordance with FIG. 4, wherein a functional unit of a work unit of the apparatus is moved together with the conveyor unit into the raised maintenance position.

In the apparatus in accordance with the invention for processing food products shown in FIGS. 3 to 5, the product conveyor 31 and the work unit 13 are not designed as machines to be installed separately, but are rather merged into one unit. Specifically, the frame 35 of the product conveyor 31 is fastened, as shown, to the work unit 13 at a spacing from the base 27. This means that the product conveyor 31 is completely carried by the work unit 13 and is supported thereat both in the horizontal direction and in the vertical direction. The mass and the stiffness of the work unit 13 is sufficient to give the total unit stability. The conveyor unit 37 of the product conveyor 31 is likewise pivotable in the embodiment of the invention shown in FIGS. 3 to 5 between a lowered operating position and a raised maintenance position. The conveyor unit 37 is here, however, configured as a conveyor belt unit in which the shafts of the corresponding belt conveyor or strap conveyor are supported. A pivotable housing of the conveyor unit 37 can thus be dispensed with.

As in the embodiment shown in FIGS. 1 and 2, a protective cover 39 is arranged above the transfer section 28 of the work unit 13. As required, the protective cover 39 can, however, be fastened or fastenable to the lower side 40 of the conveyor unit 37 so that it is pivotable together with the latter between the operating position and the maintenance position (FIG. 5). In the maintenance case, a workstep can thus be saved. The protective cover 39 in the apparatus in accordance with the invention shown in FIGS. 3 to 5 additionally serves as a collection apparatus for collecting those particles which fall down from the conveyor unit 37. The work unit 13 is thus also protected against cleaning fluid when the product conveyor 31 has to be cleaned intensively at regular intervals for hygiene reasons.

A variant of this embodiment is indicated by a broken line in FIG. 3. This variant is not shown for reasons of simplicity in FIGS. 4 and 5. In accordance with this variant, the frame 35 has an arm 67 configured as a horizontally projecting frame region. The arm 67 starts from the vertically extending frame region at the one side of the work unit 13, extends along the lower side of the work unit 13 to the oppositely disposed side and is fixed there. The work unit 13 is gripped around, in particular in the form of a clamp, by the frame 35 in this manner. With this support or holding of the product conveyor 31 at the work unit 13, a particularly uniformly distributed force introduction via the frame 35 of the product conveyor 31 into the work unit 13 can be achieved in an advantageous manner. Additional feet are also not required in this variant.

Figure 6:
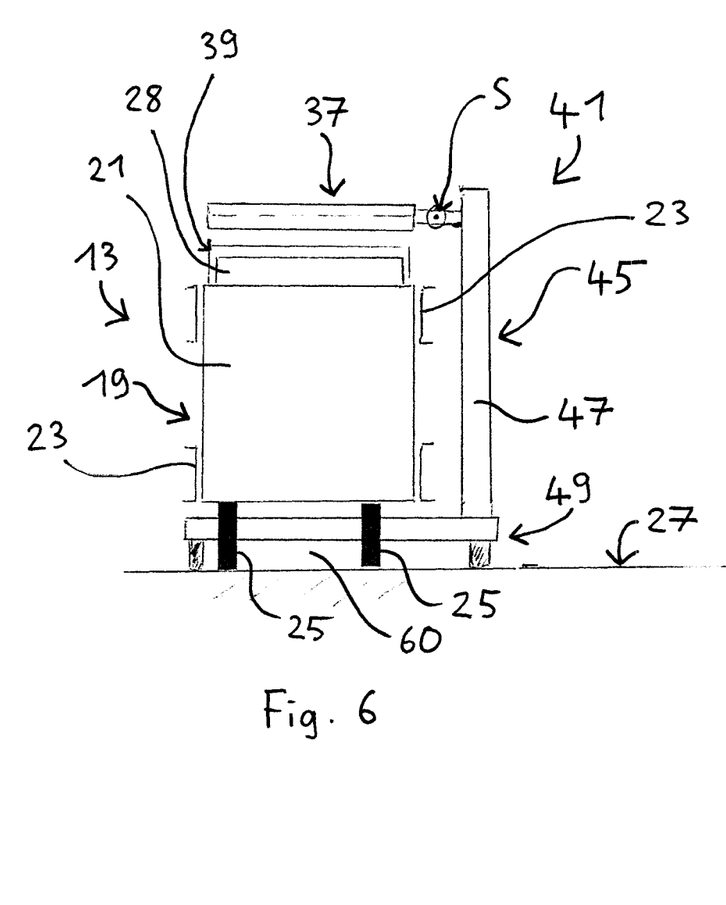
FIG. 6 shows an apparatus for processing food products in accordance with a second embodiment of the invention, wherein a conveyor unit of a product conveyor of the apparatus is located in a lowered operating position.
Figure 7:
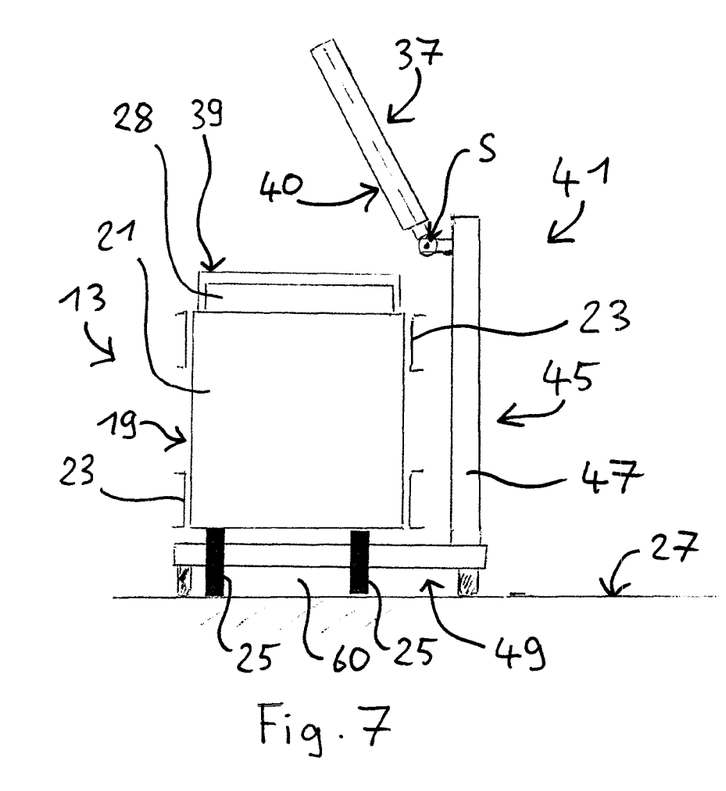
FIG. 7 shows the arrangement in accordance with FIG. 6, wherein the conveyor unit is located in a raised maintenance position.
Figure 8:
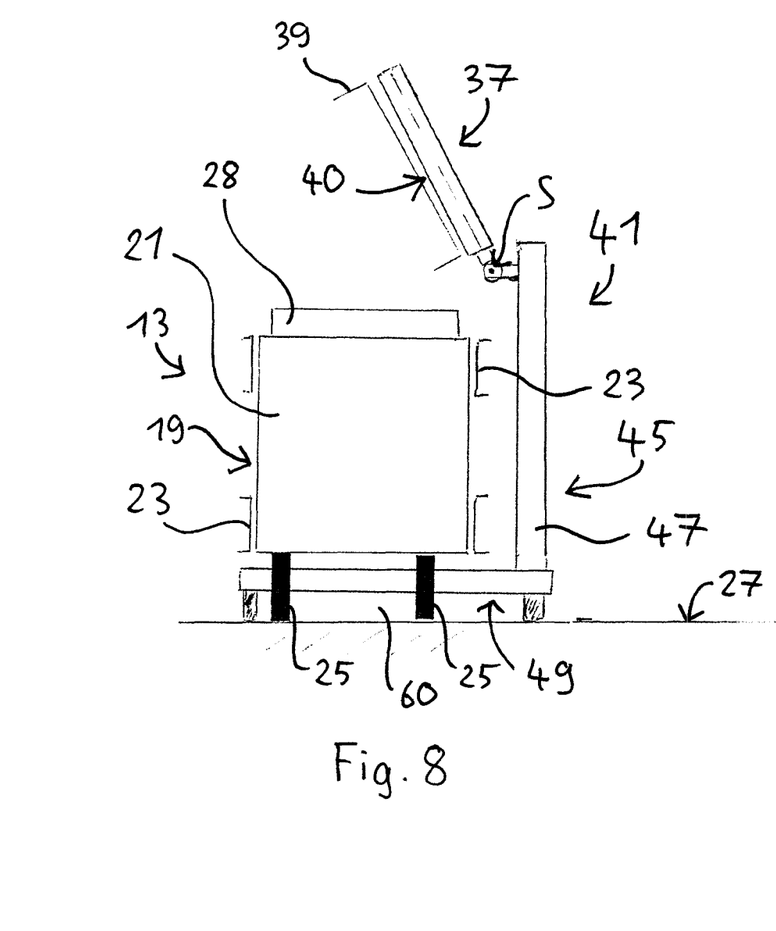
FIG. 8 shows the apparatus in accordance with FIG. 7, wherein a functional unit of a work unit of the apparatus is moved together with the conveyor unit into the raised maintenance position.

FIGS. 6 to 8 show an alternative embodiment of an apparatus in accordance with the invention for processing food products. The apparatus likewise comprises a product conveyor 41 as well as a work unit 13, but differs from the above-described embodiment to the extent that the frame 45 of the product conveyor 41 is configured as a carrying rack. The frame 45 of the product conveyor 41 specifically comprises a vertical carrier section 47 as well as a horizontal standing section 49. The frame 45 therefore has, as can be recognized in the Figures, a substantially L-shaped cross-section. The width of the standing section 49 is greater than the width of the laterally projecting conveyor unit 37 so that a sufficient stability is ensured for the product conveyor 41. The stand section 49, however, only has a small construction height so that it can be arranged reaching into the free space 60 formed between the feet 25 of the work unit 13. Although the product conveyor 41 is stable per se, the width of the total apparatus can be reduced with respect to the arrangement shown in FIGS. 1 and 2. If required, the standing section 49 can be fastened to the work unit 13 for additional stabilization.

As in the embodiment shown in FIGS. 3 to 5, the conveyor unit 37 is also configured as a conveyor belt unit in the embodiment shown in FIGS. 6 to 8 and is pivotable between a lowered operating position (FIG. 6) and a raised maintenance position (FIGS. 7 and 8). In accordance with FIG. 8, the protective cover 39 is in turn fastened or fastenable to the lower side 40 of the conveyor unit 37.

Figure 9:
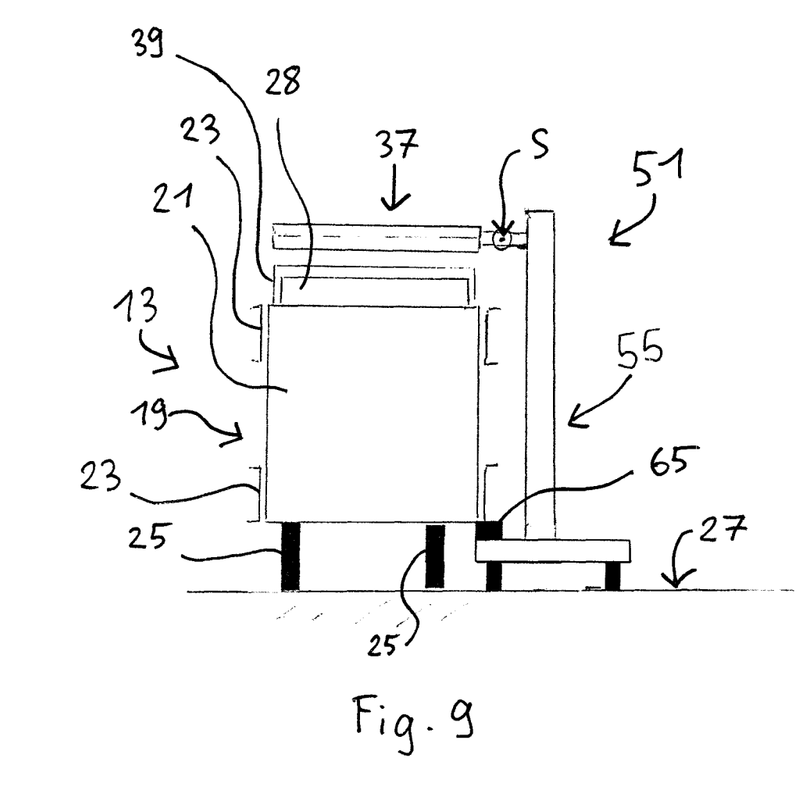
FIG. 9 shows an apparatus for processing food products in accordance with a third embodiment of the invention, wherein a conveyor unit of a product conveyor of the apparatus is located in a lowered operating position.
Figure 10:
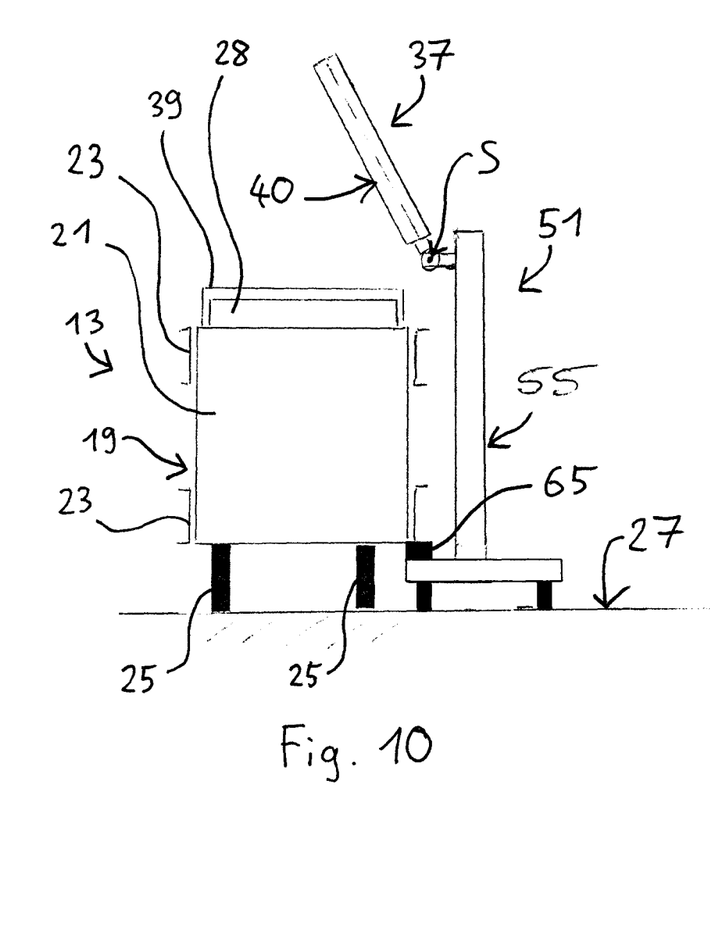
FIG. 10 shows the arrangement in accordance with FIG. 9, wherein the conveyor unit is located in a raised maintenance position.

In the embodiment of an apparatus for processing food products in accordance with the invention shown in FIGS. 9 and 10, the frame 55 of the product conveyor 51 is supported both at the floor 27 and at the work unit 13. The frame 55 is specifically fastened to one of the side carriers 23 by means of a connection element 65, for example is screwed thereto. Due to this fastening, the frame 55 does not necessarily have to be stable per se so that it can be designed correspondingly lighter and smaller. The conveyor unit 37 is also configured as a conveyor belt unit in the embodiment shown in FIGS. 9 and 10 and is pivotable between a lowered operating position (FIG. 9) and a raised maintenance position (FIG. 10). The protective cover 39 can in turn, as required, be fastened to the lower side 40 of the conveyor unit 37, which is, however, not shown in FIGS. 9 and 10.

A substantially lighter and more compact construction for the processing apparatus as a whole can be achieved by the inclusion of the work unit 13 to be arranged beneath the conveyor unit 37 into the support construction of the frame 35, 45, 55 of the product conveyor 31, 41, 51—whether in the form of a direct mechanical support connection and/or by direct utilization of a free space defined by the work unit 13.

REFERENCE NUMERAL LIST 11 product conveyor
13 work unit
15 frame of the product conveyor
17 conveyor unit
19 frame of the work unit
21 cross member
23 side carrier
24 supply and control unit
25 foot
27 base, floor
28 transfer section
29 protective cover
30 housing
31 product conveyor
35 frame of the product conveyor
37 conveyor unit
39 protective cover
40 lower side of the conveyor unit
41 product conveyor
45 frame of the product conveyor
47 carrier section
49 standing section
51 product conveyor
55 frame of the product conveyor
60 free space
65 connection element
67 frame region, arm
S pivot axis

The invention claimed is:

1. An apparatus for processing food products, comprising:
a product conveyor having a frame and a conveyor unit for conveying products along a conveying direction, wherein the conveyor unit is arranged at the frame projecting laterally with respect to the conveying direction; and
an automatic packaging machine which is associated with the processing of the conveyed products and arranged at least partly vertically beneath the projecting conveyor unit of the product conveyor, the conveyor being configured for feeding the products, being conveyed by the product conveyor, into respective packaging units provided by the automatic packaging machine;
the entirety of the conveyor unit of the product conveyor pivotable about an axis defined by a coupling location of the conveyor unit and the frame of the product conveyor, the conveyor unit pivotable to move the conveyor unit between a lowered operating position and a raised maintenance position, wherein pivoting from the lowered operating position to the raised maintenance position moves the conveyor unit away from the automatic packaging machine;
the automatic packaging machine having a holding frame;
the frame of the product conveyor fixed to the holding frame of the automatic packaging machine with a mechanical connection and supported at the holding frame of the automatic packaging machine in a vertical direction so that the product conveyor is completely carried by the automatic packaging machine.

2. The apparatus in accordance with claim 1,
wherein the frame of the product conveyor is supported both at a base on which the automatic packaging machine is supported and at the automatic packaging machine, and/or
wherein the frame of the product conveyor provides a stiffness and stability to carry and operate the conveyor unit together with the automatic packaging machine.

3. The apparatus in accordance with claim 1,
wherein a protective cover of the automatic packaging machine is movable together with the conveyor unit.

4. The apparatus in accordance with claim 3,
wherein the protective cover provides an operating function of the automatic packaging machine in an operating position and simultaneously provides an operating function of the conveyor unit.

5. The apparatus in accordance with claim 1,
wherein the frame of the product conveyor engages beneath or engages around the automatic packaging machine at a bottom side of the automatic packaging machine.

6. An apparatus for processing food products, comprising:
a product conveyor having a frame and a conveyor unit for conveying products along a conveying direction, wherein the conveyor unit is arranged at the frame projecting laterally with respect to the conveying direction; and a deep-drawing device for providing packaging depressions in a plastic film web which is associated with the processing of the conveyed products and arranged at least partly vertically beneath the projecting conveyor unit of the product conveyor, the entirety of the conveyor unit of the product conveyor pivotable about an axis defined by a coupling location of the conveyor unit and the frame of the product conveyor, the conveyor unit pivotable to move the conveyor unit between a lowered operating position and a raised maintenance position, wherein pivoting from the lowered operating position to the raised maintenance position moves the conveyor unit away from the automatic packaging machine;

the product conveyor being configured for feeding the products, being conveyed by the product conveyor, into the packaging depressions provided by the deep-drawing device;

the deep-drawing device having a holding frame;

the frame of the product conveyor fixed to the holding frame of the deep-drawing device with a mechanical connection and supported at the holding frame of the deep-drawing device in a vertical direction so that the product conveyor is completely carried by the deep-drawing device.

7. The apparatus in accordance with claim 6, wherein the frame of the product conveyor is supported both at a base on which the deep-drawing device is supported and at the deep-drawing device, and/or wherein the frame of the product conveyor provides a stiffness and stability to carry and operate the conveyor unit together with the deep-drawing device.

8. The apparatus in accordance with claim 6, wherein a protective cover of the deep-drawing device is movable together with the conveyor unit.

9. The apparatus in accordance with claim 8, wherein the protective cover provides an operating function of the deep-drawing device in an operating position and simultaneously provides an operating function of the conveyor unit.

10. The apparatus in accordance with claim 6, wherein the frame of the product conveyor engages beneath or engages around the deep-drawing device at a bottom side of the deep-drawing device.

* * * * *